Oct. 20, 1925.  
R. L. GUTHRIE  
1,558,352  
CULTIVATOR  
Filed Sept. 1, 1922  
2 Sheets-Sheet 1
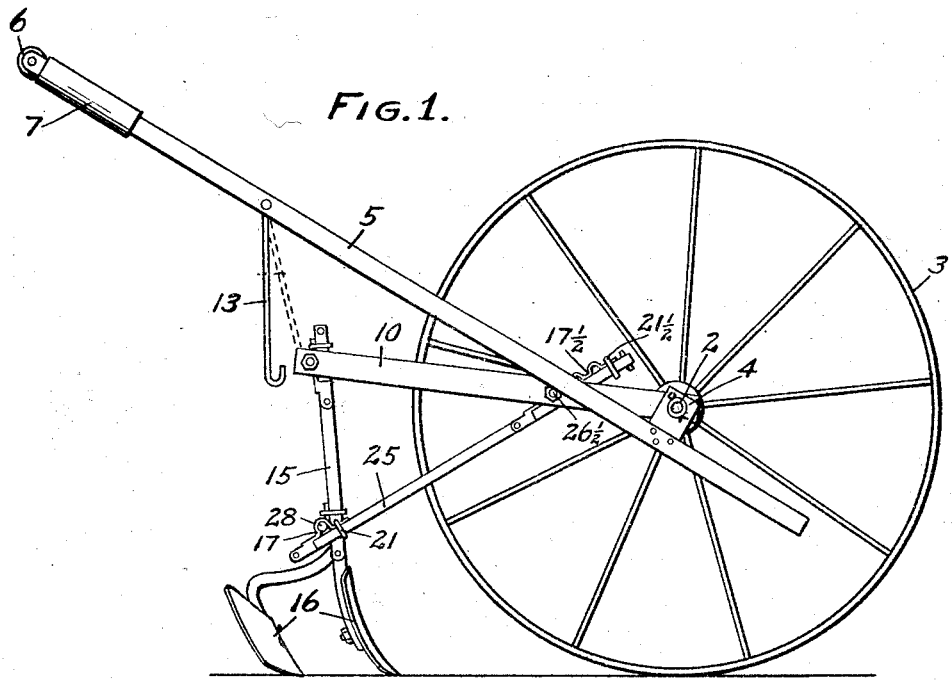
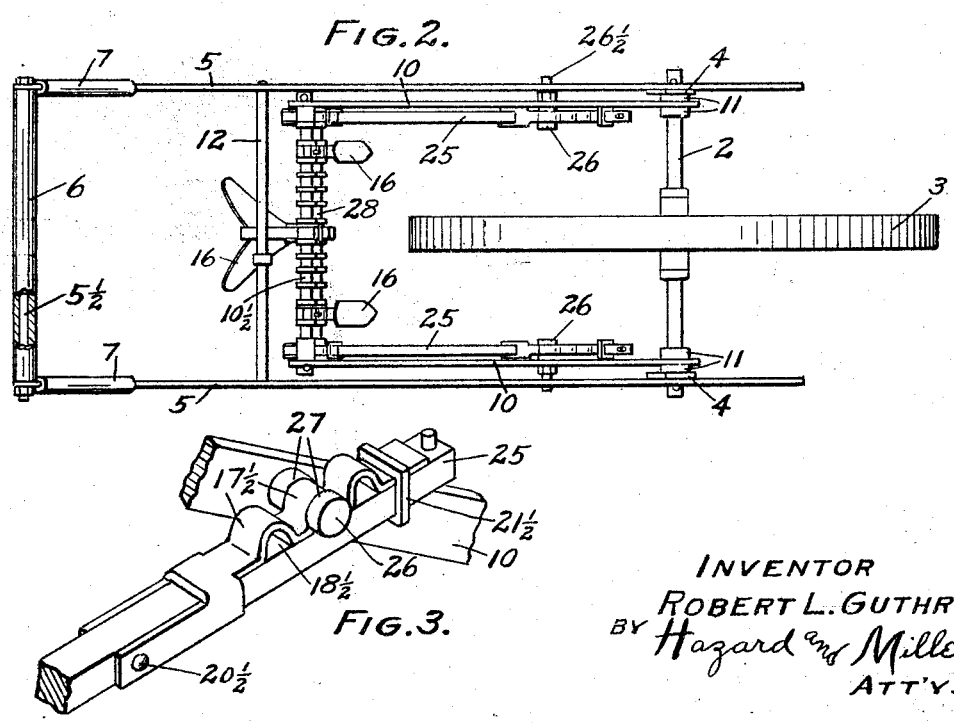
INVENTOR  
ROBERT L. GUTHRIE  
BY Hazard and Miller  
ATT'YS.

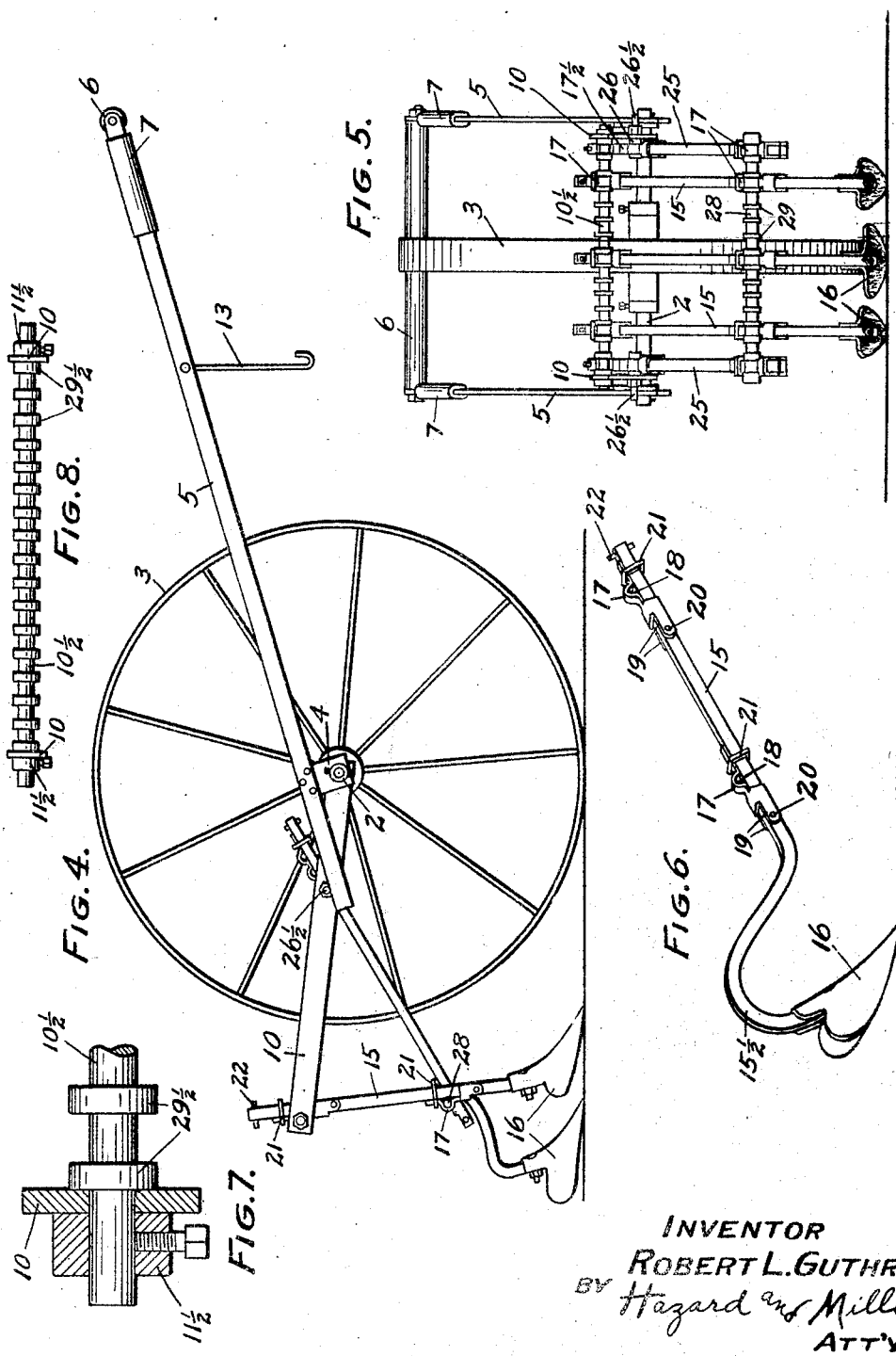

Patented Oct. 20, 1925.

1,558,352

UNITED STATES PATENT OFFICE.

ROBERT L. GUTHRIE, OF LOS ANGELES, CALIFORNIA, ASSIGNOR TO ABBIE C. GUTHRIE, OF LOS ANGELES, CALIFORNIA.

CULTIVATOR.

Application filed September 1, 1922. Serial No. 585,636.

*To all whom it may concern:*

Be it known that I, ROBERT L. GUTHRIE, a citizen of the United States, residing at Los Angeles, in the county of Los Angeles and State of California, have invented new and useful Improvements in Cultivators, of which the following is a specification.

This invention relates to cultivators, and particularly to manually propelled cultivators, such for instance as are shown in my Patents No. 1,342,285, dated June 1, 1920 and No. 1,351,643, dated August 31, 1920.

In the types of machines shown in the above mentioned patents there is provided a main axle having on its ends supporting wheels, and parallel to the axles there extend cross bars or plates which are arranged in parallelism and supported in side arms of frames of the cultivator, and means are provided for attaching and bracing plow standards to the said bars or plates.

It is one of the broad objects of the present invention to provide for a reconstruction of the designated cultivators in order to secure extreme simplicity as a whole and of the several parts, to secure compactness of the elements of the cultivator, to secure means enabling facile adjustment of the parts whereby the cultivator may be either pulled or pushed by man power. Another object is to provide a simple, practicable, reliable and inexpensive form of fastening means for adjustably securing elements of the cultivator in different positions as may be required. Another object is to provide a simple device for providing for the elevating of the plow carrying frame both to regulate the depth of cut and to facilitate turning and transporting of the plow from place to place during which movement the plows are held disengaged from the soil.

Another object is to provide a cultivator structure, the elements of which are so designed, connected and proportioned that the cultivator may be quickly assembled and may be knocked down so that its various parts can be compactly arranged for packing and transportation and storage.

Another object is to provide a connecting means or frame element having provision for the substantial lateral support and for determining the various positions in which the plow standards may be attached to the cultivator.

Other objects and advantages will be made manifest in the following specification of an embodiment of the invention illustrated in the accompanying drawings, wherein Figure 1 is a side elevation of the improved cultivator showing the handle frame so arranged as to the plows that the cultivator is pushed by man power.

Fig. 2 is a plan of the device with its parts as shown in Fig. 1.

Fig. 3 is a perspective of a fastening means for adjustably connecting certain elements of the cultivator.

Fig. 4 is a side elevation of the cultivator showing the handle frame so arranged as to enable the pulling of the plows.

Fig. 5 is a rear end elevation looking toward the plows.

Fig. 6 is a perspective of one type of plow and its standard that may be applied to the cultivator and showing the standard attaching means.

Fig. 7 is a sectional view showing in detail means for fastening knock-down elements in assembled position.

Fig. 8 is a side elevation of the detached cross piece of the upper frame.

The cultivator of my present invention is shown as including an axle 2 upon the medial portion of which there is arranged a single supporting wheel 3, and on the ends of the axle there are arranged simple bearing plates 4 swinging on the axle and to which plates are secured the respective side members 5 of a substantially U-shaped handle frame having a transverse connecting part 5½ which for convenience and comfort of the operator may be covered with a cushioning sheath, such as a rubber tube 6. The outer ends of the handle members 5 may also be sheathed in rubber or fiber grips 7. This handle is adapted to be swung from the position shown in Fig. 1 over to the position shown in Fig. 4, thereby enabling the pushing and pulling of the plow attached to the cultivator as may be desired or convenient.

A second substantially U-shaped frame is also mounted on the axle 2, and this frame is shown as comprising side bars 10, the inner ends of which are clamped between set collars 11, and these side bars extend in substantially parallel relation to the side bars of the handle frame, and their outer ends are transversely connected or united by a connecting rod or cross piece 10½. For enabling the knocking down and compact packing of the device, the cross piece 10½ of the cultivator frame is provided with removable clamp collars 11½ between which the contiguous rear end of the frame bars 10 is arranged. It is desirable to provide a simple and effective means enabling the operator to quickly vary the depth of cut of plows attached to the cultivator frame and also to entirely elevate the plows from the soil so that the cultivator can be freely pushed from place to place and also can be readily swung around at the end of rows of furrows, and this I accomplish by providing the U-shaped handle with a cross rod 12, and on it pivotally hangs a hook 13 which, when lowered, can be swung under and grapple with the cross piece 10½ of the cultivator frame 10. When so connected this frame can be lifted or lowered as may be desired.

Various forms of plows and cultivating instruments may be attached to the cultivator structure, and one form of such instrument is shown in Fig. 6 as having a straight shank 15 with a hook end 15½ forming a claw to which is applied a plow plate 16. In Fig. 1 two forms of plows 16 are shown as attached to the cultivator.

For facilitating attachment of the plow standards, a suitable fastening means is shown as comprising, in Fig. 4, a clamp member having a notched or corrugated back 17, the notch 18 of which is adapted to be closed down across the connecting cross piece 10½ of the cultivator U-shaped frame. The back 17 of the clamping device has parallel side lugs 19 and these embrace the sides of the shank 15 and receive a pivot 20 passing through the same so that the clamping device is constantly attached to and pivotally mounted on its plow standard 15. The outer end of the clamping back 17 is adapted to be swung down upon the contiguous face of the standard 15, and then a sliding loop 21 of suitable form may be pushed down the shank and over the back end, thereby firmly holding the latch member in closed position and securing the plow standard to the cross piece 10½ at any desired position. To prevent entire removal and loss of the loop 21, a pin or other stopping device 22 is provided on the outer plow standard 15 in such position as to permit the sliding of the loop 21 sufficiently to release the swinging end of the clamp member 17. Each standard is shown as provided with a plurality of the clamp devices 17 to enable the substantial fastening of the plow beams in the desired position upon the cultivator.

While the upper ends of the plow beams 15 are thus detachably clamped to the cross piece 10½, the lower portions of the beams are likewise detachably connected to a bracing device. The bracing device is, preferably substantially in the form of a U-shaped frame and has parallel radius rods 25, the inner ends of which are adapted to be detachably mounted each upon a respective short inwardly projecting transverse stud 26 provided on each contiguous frame side bar 10, Fig. 3, and which transverse pin may be provided with spaced shoulders 27 between which there may be arranged a form of clamping device 17½ similar to the clamping devices 17, previously described, except that each clamping device 17 is provided with a plurality of notches 18½ to enable the adjustment of the radius arms 25 inwardly or outwardly, for a purpose to be described. The clamping members 17½ upon the radius bars 25 are fastened in closed position by loops 21½ slidable along the ends of the clamping devices 17 so as to disengage the same and to hold the same in closed position.

The radius rods 25 are connected rigidly by a suitable connecting device or cross bar 28 which is clearly shown in Fig. 5 as having a plurality of longitudinally spaced collars or shoulders 29 between which are formed grooves to receive clamping members 17 which are provided as shown in Fig. 6 on the lower portions of the various plow standards 15. Thus a plow standard, having two clamping devices 17 suitably spaced along the same, can be readily attached to the upper cross piece 10½ and the lower cross bar 28 simply by opening the clamping member 17 and adjusting the standard to the cross members and then closing the clamps and locking the same by their respective loop members 21. The outer swinging ends of the radius rods 25 are connected with clamp members 17 and this enables the ready adjustment and detachment of the radius rods as to the cross piece 28. This latter member being suitably notched or shouldered along its length provides for the substantial supporting of the lower portions of the plow standards when these are attached and for the purpose of changing the angle at which the plow standards stand, it is only necessary to disconnect the clamp members 17½ from the supporting pins 26 on the side bars 10 and shift the radius rods so as to bring one or the other of the notches 18½ of the clamps into position over the supporting pins 26 and then apply the clamps and lock the same by their loops 21½. Thus the beams can be pushed outwardly or can be pulled inwardly and fastened simply by rearrangement of the pins 26 in the clamps 17½ of the radius rods.

From the above it will be seen that by arranging the elements to form substantially U-shaped frames, it is possible to produce a single wheel manually operable garden cultivator, all of the parts of which are of extremely simple construction and may be readily replaced, renewed and repaired, and which are capable of being packed and shipped in knocked down condition, and easily assembled and fastened to obtain a substantial and secure cultivator structure.

The pivot pins 26 provided on the side arms 10 are shown as projecting laterally as at 26½ so as to engage the side members 5 of the handle. Therefore, when the handle is in the position shown in Fig. 1, it presses down on the pins 26½ to force the plows into the ground when the handle is in the position shown in Fig. 4, with extended portions swung up under the pins 26½ and may, therefore, lift the plow.

As clearly shown in Fig. 8, the upper cross piece 10½ may be provided with longitudinally spaced shoulders 29½ forming channels or grooves to receive the upper ends of the plow standards.

Further embodiments, modifications and changes may be resorted to within the spirit of the invention as here claimed.

What is claimed is:

1. A cultivator comprising an axle, a supporting wheel mounted upon the center of the axle, bearing plates swingingly mounted on the ends of the axle, a U-shaped handle frame having side members secured to the bearing plates so that the handle may be swung forwardly and backwardly over the wheel, a second U-shaped frame mounted on the axle inside of the bearing plates, set collars on the axle to hold the arms of the second frame from lateral movement, the cross portion of the second frame being a rod having its ends extending through the ends of the side bars and removable clamp collars upon the rod against the side bars, a cultivator element mounted upon the cross rod, and a hook connected to the handle frame and adapted to optionally engage under the cross rod so as to carry the cultivator element up and down with the handle.

2. A cultivator comprising an axle, a supporting wheel rotatably mounted upon the center of the axle, bearing plates swingingly mounted on the ends of the axle, a U-shaped handle frame attached to the bearing plates and adapted to swing forwardly and backwardly over the wheel, a second U-shaped frame having side bars mounted on the axle inside of the bearing plates, a rod connecting the swinging ends of the side bars, a cross rod in the handle, a hook mounted upon the cross rod and adapted to optionally engage the rod of the second U-shaped frame, a cultivating instrument having a shank fitting against the rod, a clamp member having a notch to receive the rod and pivotally connected to the shank, and a sliding loop upon the shank to engage the opposite end of the clamp from the pivot.

3. In a cultivator, an axle, a supporting wheel upon the center of the axle, side bars mounted upon the ends of the axle, a rod connecting the swinging ends of the side bars, a cultivating instrument fitting against the rod, a clamp pivoted at one end to the shank and adapted to fit around the rod, and a loop slidingly mounted upon the shank to engage the opposite end of the clamp from the pivot.

4. In a cultivator, an axle, a supporting wheel upon the center of the axle, side bars mounted upon the ends of the axle, a rod connecting the swinging ends of the side bars, a cultivating instrument fitting against the rod, a clamp pivoted at one end to the shank and adapted to fit around the rod, a loop slidingly mounted upon the shank to engage the opposite end of the clamp from the pivot, a second cultivating instrument connected to the rod in the same way, a cross bar connecting the two cultivating instruments and fitting against the shanks, clamps upon the shanks against the cross bars, loops upon the shanks to engage the clamps, radius rods connected to the cross bar, clamps pivotally connected to the radius rods, transverse studs fixed in the side bars against which the radius rods fit, the clamps embracing the studs, and loops upon the radius rods to hold the opposite ends of the clamps from the pivots.

In testimony whereof I have signed my name to this specification.

ROBERT L. GUTHRIE.